April 18, 1961
B. H. ROWLETT ET AL
2,980,394
TEMPERATURE RESPONSIVE VARIABLE MEANS FOR
CONTROLLING FLOW IN TURBOMACHINES
Filed Nov. 23, 1956
2 Sheets-Sheet 1
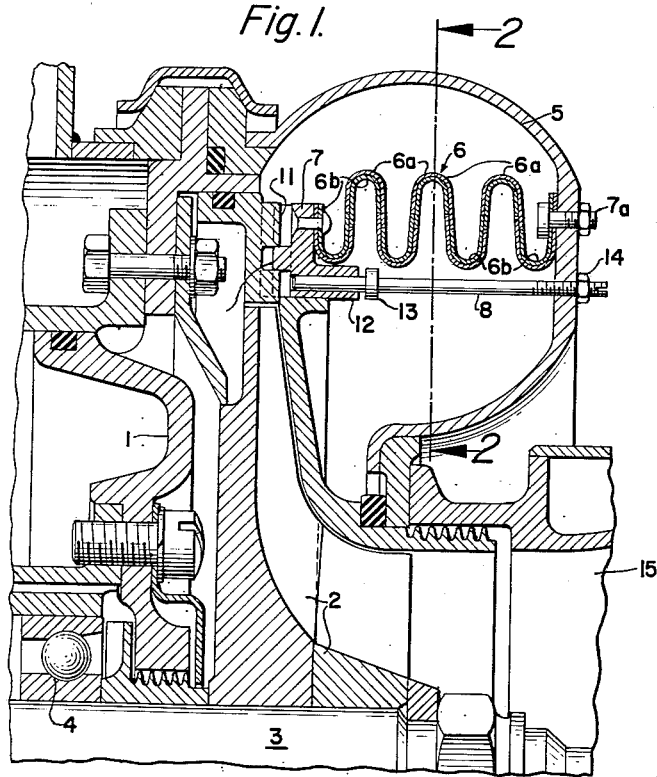
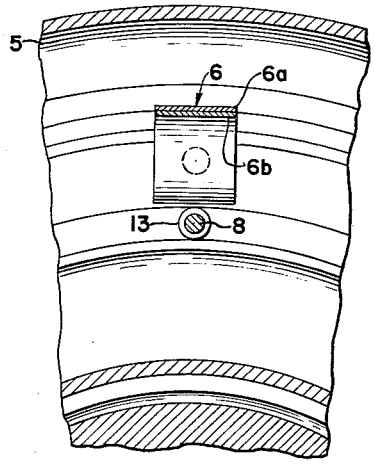
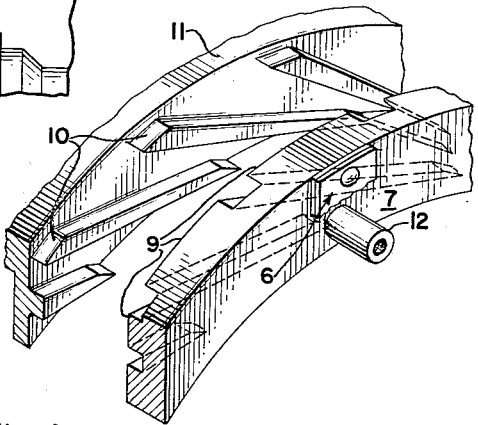
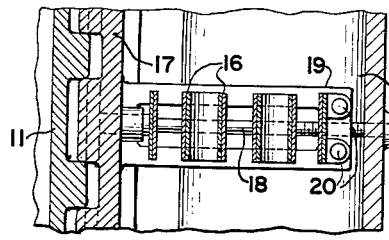
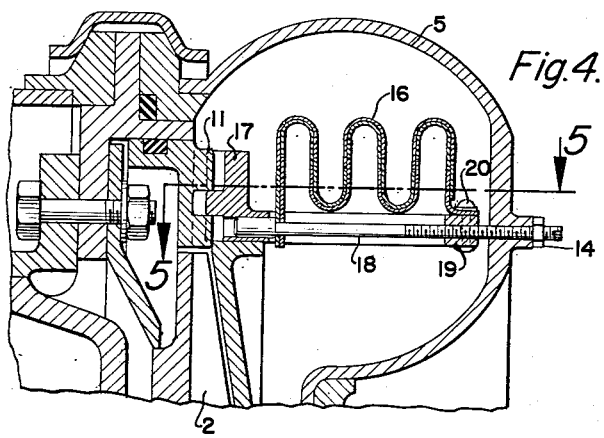
BEB H. ROWLETT,
ALEXANDER SILVER,
INVENTORS.
BY John H. J. Wallace April 18, 1961  B. H. ROWLETT ET AL  2,980,394
TEMPERATURE RESPONSIVE VARIABLE MEANS FOR
CONTROLLING FLOW IN TURBOMACHINES
Filed Nov. 23, 1956  2 Sheets-Sheet 2

BEB H. ROWLETT,
ALEXANDER SILVER,
INVENTORS.

BY John H. J. Wallace

United States Patent Office 2,980,394
Patented Apr. 18, 1961

2,980,394

TEMPERATURE RESPONSIVE VARIABLE MEANS FOR CONTROLLING FLOW IN TURBOMACHINES

Beb H. Rowlett, Playa Del Rey, and Alexander Silver, Tarzana, Calif., assignors to The Garrett Corporation, Los Angeles, Calif., a corporation of California Filed Nov. 23, 1956, Ser. No. 623,913

4 Claims. (Cl. 253—52)

This invention relates to a temperature responsive means for controlling flow in turbomachines.

When operating a turbomachine requiring a supply of compressible fluid as a motive medium, the machine may extract energy from a fluid in proportion to the temperature and pressure thereof. It is therefore recognized that the useful energy of a fluid under certain conditions of flow and presure may be varied by a change of the fluid temperature. Compressed fluid, the temperature of which varies, requires a temperature responsive flow control means to vary the flow to make most efficient use of the thermal energy contained in the fluid when it is used to operate a turbomachine.

Turbines may be used to produce power to meet a minimum requirement and are also provided with fixed area inlet nozles. The turbines are designed to produce a desired minimum power output when operated by a compressed fluid having given flow and thermal energy components. When temperature of the fluid increases, such turbines operating theron produce an unwarranted increase in power output relative to the desired minimum. In some cases the overproduction of power occasioned by an increase in the fluid temperature is wasteful and therefore contributory to inefficient use of the thermal energy.

Cooling turbines, when operated by means of compressed air bled from aircraft main engines, are subjected to changing temperatures at the inlets thereof, due to varying power output of the aircraft engine during varying flight conditions of the aircraft. In the operation of cooling turbines for conditioning a compartment of the aircraft, it is sometimes desirable to maintain a substantially constant refrigeration output of the cooling turbine. In order to maintain a constant refrigeration output of the cooling turbine when the temperature of compressed air at the inlet thereof varies, the present invention employs a temperature responsive variable area nozzle to control flow through the cooling turbine.

In the operation of cooling turbines, a temperature responsive variable area nozzle may be used to reduce flow through a cooling turbine when temperature of the flow at the inlet thereof is reduced. In this manner a temperature responsive variable area nozzle, in connection with a cooling turbine, conserves pneumatic energy bled from the compressor of an aircraft engine. At the same time it also assists in controlling refrigeration provided by the turbine for use in a compartment of an aircraft.

It is an object fo the present invention, therefore, to provide a temperature responsive variable means for a turbomachine to conserve the thermal energy component of a compressed fluid flowing therethrough, while the turbomachine is producing a constant power or refrigeration output.

Another object of this invention is to provide a temperature responsive variable means which will control fluid flow through a turbomachine in proportion to the thermal energy of the fluid.

Still another object of this invention is to provide a novel combination of a temperature responsive device operably connected with a variable inlet device to control fluid flow through a turbomachine.

Further objects and advantages of the invention will appear from the following specification, appended claims and accompanying drawings in which:

Figure 1 is a sectional view of a temperature responsive variable means, according to the invention, shown applied to a turbomachine;

Fig. 2 is a sectional view taken through line 2—2 of Fig. 1 showing a cross section of one of the temperature responsive elements;

Fig. 3 is an enlarged perspective view of a portion of the variable area nozzle device shown in Fig. 1;

Fig. 4 is a sectional view of a modified form of the temperature responsive variable means shown applied to a turbomachine;

Fig. 5 is a sectional view taken through line 5—5 of Fig. 4 showing the mounting of one of the temperature responsive elements;

Figure 6:
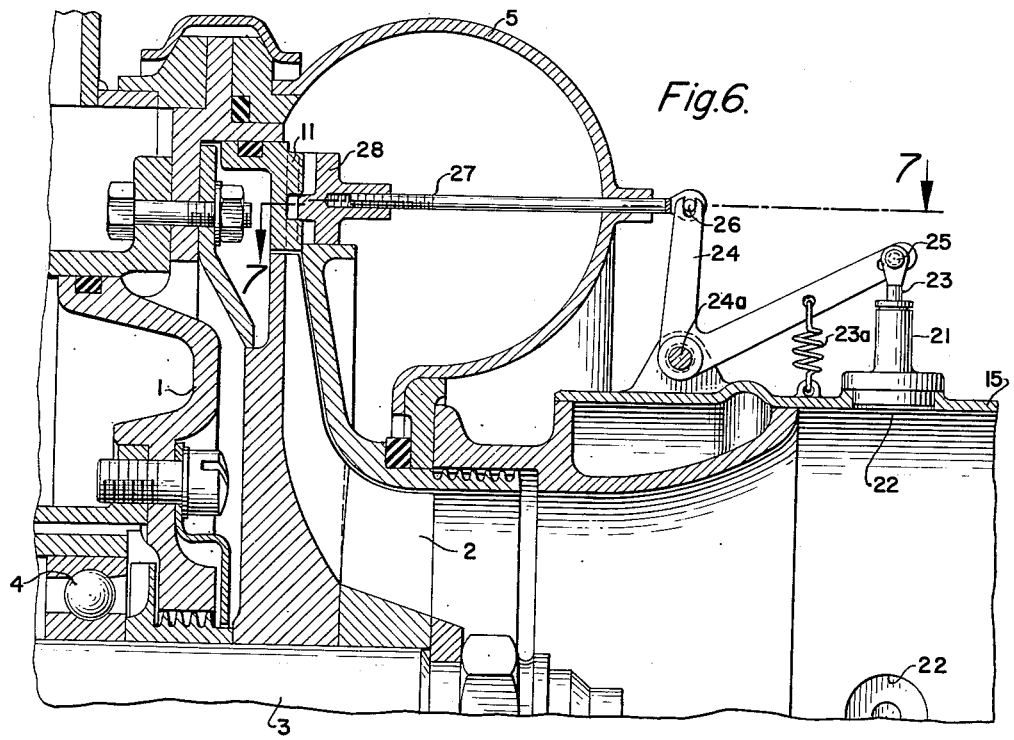
Fig. 6 is a sectional view of another modified form of the temperature responsive variable means shown applied to a turbomachine.
Figure 7:
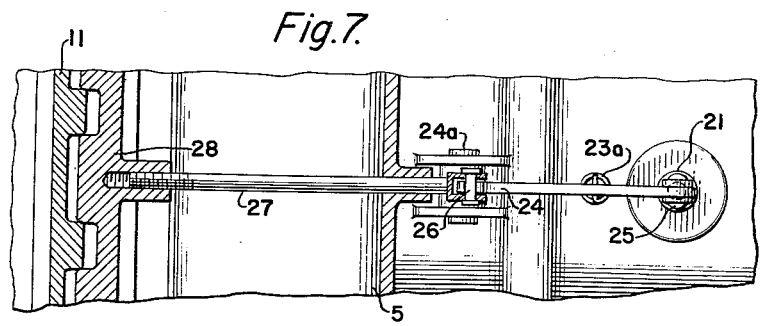
Fig. 7 is a sectional view taken through line 7—7 of Fig. 6 showing the linkage used to actuate the variable area nozzle means.

Figs. 1 to 7 illustrate several species of a temperature responsive variable means, according to the present invention. As shown in Figs. 1 through 5, the temperature responsive variable means employs a bimetal element located in a turbine inlet plenum and which is used to actuate a variable area device to control fluid flow through a turbine wheel. As illustrated in Fig. 6, a temperature responsive element disposed to sense temperature at the outlet of a turbine wheel is designed to actuate a variable area nozzle to control fluid flow at the inlet of the turbine wheel.

According to the present invention, a specific application of the temperature responsive variable means is an aircraft cabin cooling turbine driven by compressed air bled from the compressor of the aircraft engine. When the aircraft engine is operating at a varying power output, the bleed air flow through the cooling turbine is continually controlled by a temperature responsive variable means. The temperature responsive means will operate the cooling turbine at the desired refrigeration output while utilizing a minimum amount of compressed air, thus conserving power of the aircraft engine furnishing the compressed air.

Fig. 1 illustrates a conventional cooling turbine comprising a housing 1, in which a wheel 2 mounted on a shaft 3 is rotatably supported by a bearing 4. Located at the periphery of the wheel 2 is an inlet plenum 5, which directs fluid flow to the wheel 2. A temperature responsive means is mounted within the plenum 5 and includes a variable area nozzle actuated by plurality of bimetal elements 6. Each bimetal element 6 is fabricated from individual sections of two laminated metallic strips 6a and 6b which have different coefficients of expansion. The strip 6a should have a larger coefficient of expansion than 6b. Each bimetal element 6 is constructed in a corrugated form from a plurality of individual sections of the two strips 6a and 6b with the strip 6a, which has the largest coefficient of expansion, being placed on the outside of each fold as shown in Fig. 1. The individual sections are jointed together to form a complete element by any desired means such as welding or the like.

The elements 6 each have one end attached to the plenum 5 by a bolt 7a or other suitable fastening means. The opposite end of each of the elements 6 is attached or suitably fixed to a ring-shaped movable portion 7 of a variable area nozzle. The movable portion 7 is supported by a plurality of circumferentially spaced guide rods 8 and is provided with axially projecting vane elements 9, which are interleaved or meshed with conforming elements 10 of a stationary portion 11 of the variable area nozzle. The movable portion 7 also has a projecting boss 12, which contacts a stop 13 on the guide rods 8 when the movable portion 7 is in the fully open position, relative to the stationary portion 11, whereby the interleaved elements of the nozzle are prevented from shifting out of mesh with each other. The stop 13 may be adjusted by the threaded ends of the guide rods 8, which project through the plenum 5 and may be locked in position with nuts 14.

Rotation of the turbine wheel 2, as shown in Fig. 1, is initially induced by admitting fluid, under pressure in the plenum 5, to pass through the interleaved nozzle elements 7 and 11 and between the blades of the wheel 2. The energy of the fluid is then imparted to rotate the wheel 2 as the fluid expands and passes therethrough, and is exhausted at an outlet 15.

A variation in the temperature of the fluid as it enters the plenum 5 causes thermal stress in the bimetal elements which then exert force on the variable area nozzle element 7 to which the elements 6 are attached. When the temperatures of fluid in the plenum 5 decreases, the effective overall length of the bimetal elements 6 will increase thus forcing the variable area nozzle element 7 to close relative to the stationary nozzle element 11. The effective overall length of the bimetal elements will increase with a decrease in temperature due to the increase in the radius of the folds of the elements caused by the different expansion rates of the portions 6a and 6b. In effect the bimetal elements will tend to straighten out as the temperature decreases thus increasing the effective overall length of the elements. Fluid flow through the wheel 2 is thereby reduced to correspond to the decreased temperature so as to obtain a constant refrigeration output of the turbine. When an increase in fluid temperature occurs in the plenum 5, the effective overall length of the bimetal elements 6 will decrease, thus opening the variable area nozzle 7. As the temperature increases the radius of the folds in the bimetal element will decrease thus shortening the overall length of the element. Fluid flow through the wheel 2 is thereby increased to correspond to the increase in temperature so as to obtain a constant refrigeration output of the turbine. The temperature responsive means, therefore, proportions the flow of fluid through the variable area nozzle according to the thermal energy of the fluid at the turbine inlet.

Attention is directed to Fig. 4 which illustrates a modification of the temperature variable means shown in Figs. 1 and 2. In this modification the mounting of the bimetal elements is changed so that it closes the variable nozzle as the temperature increases instead of opening it as described in Fig. 1 which is particularly adapted for use in a power turbine utilized for constant power output. A plurality of bimetal elements 16 interconnect a movable portion 17 of a variable area nozzle element and guide rods 18. Each bimetal element 16 is of a similar construction to the element 6 in Fig. 1 and is made from laminations of two different metals, each metal having a different coefficient of expansion. The element is formed in a corrugated configuration from individual sections of the two laminated metals so that an outside lamination of each section of each fold consists of the metal having the greater coefficient of expansion, and the inside lamination of each section of each fold consists of metal having the lesser coefficient of expansion. The individual sections are joined by any desired means such as welding or the like. The elements 16 each have one end attached to an extension 19 of the movable portion 17 of the variable area nozzle by means of rivets 20 or other fastening means. The opposite ends of the elements 16 are welded or suitably fixed to the guide rods 18. The movable portion 17 of the variable area nozzle 15 is supported by a plurality of circumferentially spaced guide rods 18 and is provided with the extension 19 to guide movement of the nozzles in addition to providing an attachment for the elements 16. Except for the temperature responsive control arrangement, the turbomachine of Fig. 4 is otherwise the same as shown in Fig. 1.

When an increase in fluid temperature occurs in the plenum 5, as shown in Fig. 4, each of the bimetal elements 16 will tend to contract or shorten, thus closing the variable area nozzle 17. Fluid flow through the wheel 2 at an increased temperature is thereby reduced correspondingly to obtain a constant turbine power output. When a decrease of fluid temperature occurs in the plenum 5, each of the bimetal elements 16 tends to straighten out or increase in overall length, thus causing the variable area nozzle 17 to open. Fluid flow through the wheel 2 at reduced temperature is thereby increased correspondingly to obtain a constant turbine power output.

Fig. 6 illustrates a further modification of the temperature responsive variable means wherein a plurality of circumferentially spaced temperature responsive elements 21 sense temperature of and are located in the turbine exhaust duct 15. Each temperature responsive element 21 consists of a conventional thermostatic or temperature sensitive variable element 22 disposed to actuate a piston 23, so that an increased temperature of the variable element 22 extends the piston 23 and a decrease in temperature permits the piston 23 to be retracted by a spring 23a connected to a bellcrank 24. Each bellcrank 24 is pivoted on a pin 24a supported by ears which project radially from the turbine exhaust duct 15. The bellcrank 24 transmits the force of the temperature responsive elements 21 to the axially movable rods 27. Each piston 23 is attached to one end of a bellcrank 24 by a pin 25, and the other end of each bellcrank is attached to one of the rods 27 by a pin 26. The axially movable rods 27 project into the plenum 5 and are threaded into the movable portion 28 of the variable area nozzles. The rods 27 actuate and guide the movable portion 28 of the variable area nozzle and are movable axially relative to the turbine wheel. Except for the temperature responsive control arrangement, the turbomachine of Figs. 6 is otherwise the same as Fig. 1.

When exhaust temperature of the turbine shown in Fig. 6 is reduced below a predetermined value, the pistons 23 of the temperature responsive elements 21 contract and are retracted by the spring 23a, thus moving the bellcranks 24 and the axially movable rods 27 to further open the movable portion 28, of the variable area nozzle, relative to the stationary portion thereof. The variable area nozzle when further opened will allow an increase in fluid flow through the wheel 2 to obtain a constant turbine power output.

When the inlet fluid temperature through the turbomachine increases, the temperature responsive elements 21 in the turbine exhaust outlet 15 will sense an increased temperature and expand, thus moving the bellcranks 24 and axially movable rods 27 in a direction to close the movable portion 28 of the variable area nozzle relative to the stationary portion thereof. Such restriction of the nozzle area will reduce the fluid flow through the wheel 2 to obtain a constant turbine power output.

When the present invention is used in cooling turbines, the foregoing temperature responsive devices may be disposed to move the variable area nozzle toward a closed position when the turbine inlet temperature decreases, in order to maintain the turbine exhaust at a constant temperature.

We claim:

1. In a temperature responsive variable means for controlling flow in turbomachines; a turbine wheel having an inlet, means forming a variable area device disposed at said inlet to control flow through said turbine, a bimetal temperature sensing element disposed in said inlet to sense fluid temperature therein, said temperature sensing element being connected to said variable area device to actuate the same, and guideways extending axially relative to said turbine wheel and disposed to support both said variable area device and said bimetal temperature responsive device.

2. A temperature responsive variable area nozzle for turbomachines comprising: a turbine wheel rotatably mounted in a casing; an inlet and outlet formed in said casing for establishing a fluid flow path through said turbine wheel; a variable area nozzle having interleaved vane elements mounted in said casing adjacent said inlet; one of said vane elements being fixed to said casing and the other of said vane elements being supported for axial movement by guide means secured to said casing; an elongated bimetallic element, said bimetallic element having a corrugated axial cross-section, one end of said bimetallic element being fastened to said casing and the other end being fastened to said other vane element whereby expansion and contraction of said bimetallic element will position said other vane element.

3. In a temperature responsive variable means for controlling the flow of fluid in turbomachines: a casing having fluid inlet and outlet passages; a turbine wheel rotatably mounted in said casing in the flow between said inlet and outlet passages, the turbine wheel and the inlet and outlet passages forming a flow path for the fluid; a variable area device disposed in said flow path adjacent the periphery of the turbine wheel, said variable area device having interleaved elements movable substantially axially relative to the axis of said turbine wheel to control flow therethrough; an expansion element disposed entirely within said inlet passage and arranged to sense the temperature of the fluid in said inlet passage and to change in overall length in response to changes in the temperature of the fluid therein; means for connecting a portion of said expansion element to said variable area device in a manner to directly impart movement of said expansion element to said axially movable interleaved elements; and guide means in said inlet passage mounted axially relative to said turbine wheel and disposed to support said movable interleaved elements.

4. In a temperature responsive variable means for controlling the flow of fluid in turbomachines: a casing having fluid inlet and outlet passages; a turbine wheel rotatably mounted in said casing in the flow between said inlet and outlet passages, the turbine wheel and the inlet and outlet passages forming a flow path for the fluid; a variable area device disposed in said flow path adjacent the periphery of the turbine wheel, said variable area device having interleaved elements movable substantially axially relative to the axis of said turbine wheel to control flow therethrough; an expansion element disposed entirely within said inlet passage and arranged to sense the temperature of the fluid in said inlet passage and to change in overall length in response to changes in the temperature of the fluid therein; means for connecting a portion of said expansion element to said variable area device in a manner to directly impart movement of said expansion element to said axially movable interleaved elements; and means in said inlet passage forming guideways mounted axially relative to said turbine wheel and disposed to support both said movable interleaved elements and said expansion element.

References Cited in the file of this patent
UNITED STATES PATENTS

| | | |
|---|---|---|
| 2,005,193 | Mayo | June 18, 1935 |
| 2,305,311 | Jendrassik | Dec. 15, 1942 |
| 2,372,686 | Sedille | Apr. 2, 1945 |
| 2,415,673 | Campbell et al. | Feb. 11, 1947 |
| 2,474,441 | Sparrow | June 28, 1949 |
| 2,697,326 | Featonby | Dec. 21, 1954 |
| 2,739,782 | White | Mar. 27, 1956 |
| 2,761,615 | Prince | Sept. 4, 1956 |
| 2,861,774 | Buchi | Nov. 25, 1958 |